Patented Aug. 2, 1932

1,869,906

UNITED STATES PATENT OFFICE

OTTO V. MARTIN, OF TULSA, OKLAHOMA, ASSIGNOR, BY MESNE ASSIGNMENTS, TO TEXACO SALT PRODUCTS COMPANY, OF NEW YORK, N. Y., A CORPORATION OF DELAWARE

PROCESS OF PREPARING CALCIUM CHLORIDE

No Drawing. Application filed November 14, 1927, Serial No. 233,307. Renewed September 9, 1931.

This invention relates to a process of preparing calcium chloride and more particularly to a process of preparing an anhydrous calcium chloride from naturally occurring and artificially prepared brines and the like.

It is an object of this invention to provide an economical and practicable process for obtaining a very superior technical calcium chloride from cheap sources hitherto economically unavailable, such as oil and salt well brines, and also from brines produced in the ammonia soda process and the like.

It is a further object of this invention to provide a process of preparing cacium chloride from waters containing small percentages of calcium chloride and other dissolved salts, wherein the preliminary evaporation of the waters to form a concentrated solution is effected with great heat economy in a system, described in my copending application entitled—"Process for the production of salts from brines and solutions" filed May 19, 1926, Serial No. 110,219, said system including heat transfer and cooling-by-evaporation apparatus.

It is a further object of this invention to provide a process of preparing calcium chloride from dilute solutions containing calcium chloride and other salts, wherein use is made of waste heat in combination with a spray pond or the like for effecting concentration of the solution to a point where salts other than calcium chloride will be largely precipitated out of solution and can be recovered.

It is a further object of this invention to provide a process of preparing substantially pure anhydrous calcium chloride from brines containing calcium chloride and other salts by a series of steps including a preliminary concentration of the brines to a point at which the other salts are largely insoluble, removal by mechanical means of the precipitated salts, further concentration and filtering out the remaining insoluble salts under relatively high pressure and at high temperatures, cooling the hot solution concentrated to between 60 and 70% calcium chloride to produce a solid hydrated calcium chloride and dehydrating this hydrated product.

It is a further important object of this invention to provide a process of preparing substantially pure anhydrous calcium chloride, free from any tendency to cake and lump and in the form of relatively thin parallelogrammatic plates of comparatively uniform size and shape, having substantial voids or pores, whereby it may be extremely readily dissolved without mechanical agitation.

Other and further important objects of this invention will become apparent from the following description and appended claims.

The raw material suitable for use in my process may be any natural or artificially prepared bittern or brine containing calcium chloride and other dissolved salts. Among the principal brines that may be mentioned are oil-well and salt well brines and waste brines from the ammonia soda process for preparing sodium carbonate. Sea water also provides a possible source of calcium chloride and can be treated according to my method with slight modifications. As my process has been devised particularly for the preparation of calcium chloride from oil-well brines, it will be described in that connection, although it will be understood that other sources of calcium chloride may be employed and the calcium chloride recovered from such sources by a similar process.

The usual oil well brine, in addition to containing calcium chloride, in general also contains small quantities of magnesium chloride, iron compounds, silica alumina and relatively larger quantities of sodium chloride. In order that a very pure calcium chloride may be prepared from oil well brines, therefore, it is first necessary to remove the iron and silica, and also the magnesium chloride, since the latter has solubilities similar to that of calcium chloride. The iron compounds, silica and alumina are preferably removed by the addition of small quantities of lime or calcium hydroxide to the brines, whereupon the iron, silica and alumina are precipitated. The addition of further slight amounts of lime or calcium hydroxide results in the precipitation of magnesium hydroxide, according to the equation: $MgCl_2 + Ca(OH)_2 = Mg(OH)_2 + CaCl_2$. It will be understood that these preliminary treatments with lime or calcium hydroxide may not be necessary in the treatment of certain brines or other waters containing calcium chloride but are generally useful steps in the preparation of pure calcium chloride from the usual sources, such as above mentioned.

The brine, now substantially free from iron, silica, alumina and magnesium compounds, is next subjected to a preliminary concentration step, which, according to the process in my co-pending application above referred to, is effected by circulating the brine through a system including a waste heat transfer apparatus adapted to raise the temperature of the brine above the dew point temperature of the atmosphere and an apparatus for cooling the brine by evaporation in the atmosphere, or under atmospheric pressure.

In general, the heat transfer apparatus is preferably any type of surface condenser such as may commonly be found in power plants and the like, but other kinds of heat exchange apparatus may be employed. By the use of suitable apparatus, the waste heat from stack gases or other non-condensible hot gases might be utilized, or in certain cases it might even be economical to produce the heat necessary for the process from some primary source. For my purposes, it is unnecessary that the brine be heated to any great extent, 10° or more above atmospheric temperatures being sufficient, although a greater temperature differential naturally results in more rapid evaporation. The dissipation of the heat in the liquid as it comes from the heat transfer apparatus is preferably effected in a spray pond by spraying the heated brine through nozzles capable of efficiently atomizing the bine. Other types of apparatus adapted to cool by evaporation are cooling towers, cooling ponds with or without mechanical or natural agitation, and riffles. The brine is circulated through such a system, including a heat transfer apparatus, and a cooling-by-evaporation apparatus, until the concentration of the calcium chloride in the brine reaches at least 15%, and preferably higher, say between 30 and 50%. During the concentration of the brine, a considerable quantity of the sodium chloride present in the brine will be precipitated out of the solution and will be deposited in the pond under the sprays. This sodium chloride may be removed by drag chain conveyers or by any other suitable means and marketed for the usual purposes of salt.

When the brine has reached the desired concentration in the spray pond system, it is transferred to an evaporating apparatus, which may satisfactorily be equivalent in function to a single effect evaporator. An open kettle provided with steam coils may be satisfactorily used at this stage of the process to concentrate the brine solution up to 60% calcium chloride, but at least above 40% and preferably between 45 and 55% calcium chloride. The concentration is brought about by boiling the brine solution and allowing the vapors to escape freely. During this further concentrating step substantially all of the salts other than calcium chloride will be rendered insoluble and will either be precipitated out or else will remain in suspension in the hot concentrated calcium chloride solution.

This hot solution is then pumped into a closed vessel provided with means for filtering the solution under relatively high pressure. Such a vessel may suitably be a closed tank provided with a steam jacket or heating coils to keep the solution hot, and with a false bottom comprised of two spaced perforated plates with a Monel metal screen positioned therebetween. The necessary pressure, which is in general above 150 and may run as high as 200 lbs. per square inch or higher, can be obtained by piping high pressure steam into the space above the solution. During the filtering operation the salts, principally sodium chloride, build up above the false bottom and form a filtering bed which effectively removes even the finest suspended salt particles, as well as suspended small amounts of calcium or magnesium hydroxide that may be present.

The clear, hot, pure calicum chloride solution from the filtering apparatus, if not already at a concentration of 60 to 70% calcium chloride, is further concentrated to that degree in a second evaporating vessel, which may be similar to the one above described. The purpose of this evaporating step is to produce a concentration of calcium chloride from which a solid hydrated calcium chloride, approximating $CaCl_2.2H_2O$,+ will be formed directly upon cooling. Theoretically, a solution containing about 75 grams of calcium chloride per hundred grams of solution, having a boiling point of about 175 to 176° centigrade, contains calcium chloride and water in the proper proportions to produce $CaCl_2.2H_2O$ without further evaporation. For practical purposes, however, if the concentration of calcium chloride is raised to between 60 and 70% and the solution then allowed to cool, a substantially dry, solid hydrated calcium chloride will be obtained.

This further step of cooling the concentrated pure calcium chloride solution is accomplished, according to my process, by depositing the solution upon a moving chilled surface. In practice, I prefer to employ a hollow revolving drum containing a suitable cooling fluid and adapted to be partly immersed in a bath consisting of the concentrated calcium chloride solution. A thin film of hydrated calcium chloride is thus formed on the surface of the revolving drum which may be suitably removed by means of a doctor or scraper. In general the thickness of the film formed is regulated to approximately one-sixteenth of an inch. The action of the doctor in removing the film from the revolving drum is to break up the film into small parallelogrammatic pieces or plates, fairly uniform in size and shape, in dimensions approximately one-quarter of an inch square. If it is desired to obtain more uniform plates than would ordinarily be obtained, some sort of scoring device may be employed. I have found that by cooling a 60 to 70% calcium chloride solution in the above manner, the film may be much more easily scored than where a solution of greater concentration is used. Furthermore, a 60 to 70% solution of calcium chloride is much easier to maintain in a liquid state prior to the cooling operation than a calcium chloride solution above 70%. Uniformity of the product is advantageous both for trade reasons and for the obtaining of a uniformly, readily dissolvable substance.

My process also contemplates the complete dehydration of the hydrated product produced as above, although it will be appreciated that for some purposes hydrated calcium chloride will be the desirable end product. Dehydration of the hydrated calcium chloride is effected by conveying the small plates of hydrated calcium chloride upon endless monel or similar wire screens passing through a zone, preferably heated directly by a gas flame positioned either above or below the screens. Either a single endless wire screen may be employed or a number of screens placed in series, one above the other with means for depositing the calcium chloride plates upon the successive lower screens. Preferably the heated zone is gas fired and means employed for regulating the temperature to vary the characteristics of the final product. In general, dehydration takes place at about 150° C. within a few minutes time but any temperature above 120° C. can be used and the time varied accordingly.

The hot flakes must, of course, be cooled, say to 100° C, before being packed into containers.

I have found that if the hydrated calcium chloride plates are subjected to rapid dehydration, a biscuit-like, porous product is produced. This results from the fact that when the dehydration is carried out at a point considerably above the boiling point of water, the rapid formation of steam puffs up and blisters the calcium chloride plates. The pores of the product contain more or less entrapped air, so that when the biscuit-like plates are thrown into water there is a certain amount of sizzling effect, due to the liberation of the entrapped air. This liberation of the air results in a natural agitation which produces rapid solution of the calcium chloride. Where, therefore, it is important to provide a rapidly soluble product, this porous form of calcium chloride is furnished.

On the other hand, if the hydrated calcium chloride is dehydrated slowly, a denser, more chalk-like and stronger product having less tendency to dust and break up, is produced. In either case a practically pure anhydrous calcium chloride is produced, containing less than 1% of sodium chloride and only about .002% of lime as CaO. Furthermore, due to the absence of iron compounds, silica, and other insoluble impurities, the anhydrous product dissolves to give a perfectly clear solution. Both anhydrous products are free from any tendency to lump and cake up, and are in this respect superior to known forms of anhydrous calcium chloride.

The importance to be attached to the dissolving qualities of my product will be appreciated by those familiar with the difficulties attendant upon dissolving the usual grades of calcium chloride in large quantities. While extremely soluble, calcium chloride as ordinarily made is difficultly soluble in bulk without vigorous agitation, because of the fact that a dense protecting film of saturated solution immediately forms about the calcium chloride particles, thus preventing further dissolving action. In the case of my porous, thin plate-like product, however, not only do the walls of the pores or cells present a large surface for solvent action but the air entrapped in the pores causes a certain amount of vertical movement through the solvent as the entrapped air is liberated. Furthermore, the solubility of my anhydrous product is greatly increased due to the exothermic heat of solution.

The uses to which my product may be put are numerous but chief among them may be mentioned its use in concrete or cement road building, its use for laying dust on roads, tennis courts and the like. In the making of concrete roads according to present practice about two pounds of calcium chloride is used for each bag of cement. Consequently the rapidity with which the calcium chloride can be put into solution for obtaining uniform distribution is an important factor in this type of work.

My anhydrous product has moreover greater drying and dehydrating qualities than known forms of anhydrous calcium chloride. The porous, biscuit-like plates, due to their large exposed surface areas are excellent for drying air or other gases. For instance, hot air passed over calcium chloride of this nature will rapidly dehydrate fruits, vegetables and the like.

It should be appreciated also that because of the freedom of my dehydrated product from moisture, a great saving in freight charges can be realized. This fact, taken in connection with my utilization of hitherto waste sources of calcium chloride and of heat for concentrating purposes, is indicative of the great economies that may be realized from the use of my process.

I am aware that many changes may be made and numerous details of the process may be varied through a wide range without departing from the principles of this invention and I, therefore, do not purpose limiting the patent granted hereon, otherwise than necessitated by the prior art.

I claim as my invention:

1. The process of preparing calcium chloride from oil well brines and the like, which comprises heating the brines containing calcium chloride, spraying the brines to cool and evaporate the same, continuing the heating and cooling by evaporation until the calcium chloride content of the brine has reached 30%, further concentrating the solution by boiling if necessary to about 45 to 55% calcium chloride content, filtering the hot solution under pressure, concentrating the filtrate to 60 to 70% calcium chloride content and cooling said concentrated filtrate to obtain solid hydrated calcium chloride.

2. The process of preparing calcium chloride from oil well brines and the like, which comprises heating the brines containing calcium chloride, spraying the heated brines to cool and evaporate the same, continuing the heating and cooling by evaporation until the calcium chloride content of the brine has reached 30%, further concentrating the solution by boiling to about 45 to 55% calcium chloride content, filtering the hot solution under pressure, concentrating the filtrate to 60% to 70% calcium chloride content, cooling said concentrated filtrate to obtain solid hydrated calcium chloride, and heating said hydrated calcium chloride to produce anhydrous calcium chloride.

3. The process of preparing calcium chloride from oil well brines and the like containing dissolved calcium chloride which comprises heating the brines from a source of waste heat, spraying the brines into the atmosphere to thereby cool and evaporate the same, continuing the evaporation until the calcium chloride content has reached 30%, further concentrating the solution by boiling until substantially all of the salts other than calcium chloride have been precipitated, filtering off the precipitated salts, cooling the filtrate to form calcium chloride containing water of crystallization and heating the hydrated calcium chloride to obtain the anhydrous form.

4. In a process of preparing calcium chloride from water containing calcium chloride, the initial concentration step which comprises heating the water from a source of waste heat above the dew point temperature of the atmosphere, spraying the heated water under atmospheric conditions to effect evaporation of the water and continuing this heating and spraying until the calcium chloride content of the water has been raised to over 15%.

5. In the process of preparing calcium chloride from oil well brines containing it, the initial concentration step, which comprises heating the brines to raise their temperature above the dew point temperature of the atmosphere and spraying said brines into the atmosphere for cooling by evaporation, continuing the circulation until the calcium chloride content of the brines has been raised to between 30 and 50% and then removing any insoluble material.

6. The process of preparing calcium chloride from oil well brines comprising heating and spraying the brine to effect preliminary concentration thereof, further concentrating by boiling until the calcium chloride content has reached in excess of 50%, filtering the hot solution under pressure, concentrating the filtrate to 60 to 70% calcium chloride content, and cooling said concentrated filtrate to obtain solid hydrated calcium chloride.

7. The process of preparing calcium chloride from oil well brines comprising treating the brine with lime to precipitate and remove impurities therefrom including silica, alumina, iron and magnesium compounds, heating and spraying the treated brine to effect preliminary concentration thereof, further concentrating the brine by boiling until the calcium chloride content has reached in excess of 50%, filtering the hot solution under pressure, and cooling the hot filtrate to obtain hydrated calcium chloride.

8. The process of preparing anhydrous calcium chloride from oil well brines comprising treating the brine with lime to precipitate and remove impurities therefrom including silica, alumina, iron, and magnesium compounds, heating and spraying the brine to effect preliminary concentration, further concentrating by boiling until the calcium chloride content has reached in excess of 50%, filtering the hot solution under pressure, cooling the filtered solution and forming particles of solid hydrated calcium chloride, and heating the particles of hydrated salt to obtain the anhydrous form.

9. The process of preparing anhydrous calcium chloride from oil well brines and the like which comprises heating the brine, spraying the heated brine to cool and evaporate the same, forming a solution having a calcium chloride content in excess of 15%, further concentrating the solution by boiling to about 45% to 55% calcium chloride content, filtering the hot solution under pressure, concentrating the filtrate to 60 to 70% calcium chloride content, cooling said concentrated filtrate to obtain solid hydrated calcium chloride, and heating said hydrated calcium chloride to produce anhydrous calcium chloride.

10. The process of preparing calcium chloride from an oil field brine which comprises treating the brine with an alkali adapted to precipitate and remove such impurities as silica, alumina, iron and magnesium compounds, and render the brine non-corrosive, preliminarily concentrating the treated brine to precipitate sodium chloride, removing the precipitated salt, further concentrating the brine to about 50% calcium chloride content to obtain practically complete insolubility of remaining undesirable compounds, removing the material thus precipitated, then concentrating the brine to about 70% calcium chloride content, and cooling said concentrated brine to obtain substantially pure solid hydrated calcium chloride.

In testimony whereof I have hereunto subscribed my name at Sand Springs, Tulsa County, Oklahoma.

OTTO V. MARTIN.